United States Patent
Balderaz

(10) Patent No.: US 12,527,298 B2
(45) Date of Patent: Jan. 20, 2026

(54) TELESCOPIC AND SPINNING DOG LEASH ANCHORING DEVICE

(71) Applicant: Roy Balderaz, Sinton, TX (US)

(72) Inventor: Roy Balderaz, Sinton, TX (US)

( * ) Notice: Subject to any disclaimer, the term of this patent is extended or adjusted under 35 U.S.C. 154(b) by 0 days.

(21) Appl. No.: 18/672,550

(22) Filed: May 23, 2024

(65) Prior Publication Data

US 2025/0359530 A1 Nov. 27, 2025

(51) Int. Cl.
*A01K 1/04* (2006.01)

(52) U.S. Cl.
CPC ..................... *A01K 1/04* (2013.01)

(58) Field of Classification Search
CPC ...................................... A01K 1/04
See application file for complete search history.

(56) References Cited

U.S. PATENT DOCUMENTS

| | | | | |
|---|---|---|---|---|
| 217,004 A * | 7/1879 | Elmer | | A01K 1/04 119/790 |
| 601,952 A * | 4/1898 | Day | | A01K 1/04 119/782 |
| 3,123,052 A | 3/1964 | Marshall | | |
| 3,189,004 A * | 6/1965 | Sinclair | | A01K 1/04 119/789 |
| 3,921,589 A | 11/1975 | McGahee | | |
| 4,620,506 A * | 11/1986 | Stubbs | | A01K 1/04 119/780 |
| 5,353,747 A * | 10/1994 | Fain | | A01K 1/04 119/786 |
| 5,526,774 A | 6/1996 | Swindall, Jr. | | |
| 5,870,974 A | 2/1999 | Johnson | | |
| D486,947 S | 2/2004 | Shedd | | |
| 6,820,573 B1 | 11/2004 | McMullin | | |
| 7,353,775 B1 * | 4/2008 | Stelmach | | A01K 1/04 119/61.54 |
| 7,353,780 B2 * | 4/2008 | Bean | | A63B 21/0609 119/789 |
| 7,730,852 B2 | 6/2010 | Kramer | | |
| 7,926,452 B1 * | 4/2011 | Kim | | A01K 1/04 119/799 |
| 8,567,349 B2 | 10/2013 | Wherley | | |
| 10,327,418 B2 | 6/2019 | Johnson | | |
| 2003/0066493 A1 * | 4/2003 | Scheid | | A01K 1/04 119/787 |
| 2007/0137588 A1 * | 6/2007 | Bean | | A01K 1/04 119/789 |
| 2007/0215064 A1 * | 9/2007 | Petersen | | A01K 1/04 119/786 |
| 2009/0301403 A1 * | 12/2009 | Stuerke | | A01K 1/04 119/780 |
| 2010/0224139 A1 * | 9/2010 | Krieger | | A01K 29/00 119/780 |
| 2019/0230897 A1 * | 8/2019 | Hudson | | A01K 1/04 |

FOREIGN PATENT DOCUMENTS

CA 2783323 6/2013
DE 3237960 A1 * 4/1984

* cited by examiner

*Primary Examiner* — Jessica B Wong

(57) ABSTRACT

A dog leash anchoring device includes a base assembly, a shaft, and a rotatable attachment structure. The base assembly is securable to a floor or ground surface. The shaft projects vertically from the base assembly and is selectively adjustable to different heights. The rotatable attachment structure is positioned on top of the shaft and designed to permit a leash clip to be detachably connected thereto.

4 Claims, 6 Drawing Sheets

TELESCOPIC AND SPINNING DOG LEASH ANCHORING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dog leash stakes and ties and more particularly pertains to a new dog leash anchoring device that provides 360-degree movement about a telescoping shaft that is adjustable in height.

(2) Description of Related Art Including Information Disclosed Under 37 CFR 1.97 and 1.98

The prior art relates to dog leash stakes and ties. The prior art, as best understood, does not disclose a dog leash anchoring device that provides 360-degree movement about a telescoping shaft that is adjustable in height.

BRIEF SUMMARY OF THE INVENTION

An embodiment of the disclosure meets the needs presented above in a dog leash anchoring device generally comprising a base assembly, a shaft, and a rotatable attachment structure. The base assembly is securable to a floor or ground surface. The shaft projects vertically from the base assembly and is selectively adjustable to different heights. The rotatable attachment structure is positioned on top of the shaft and designed to permit a leash clip to be detachably connected thereto.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
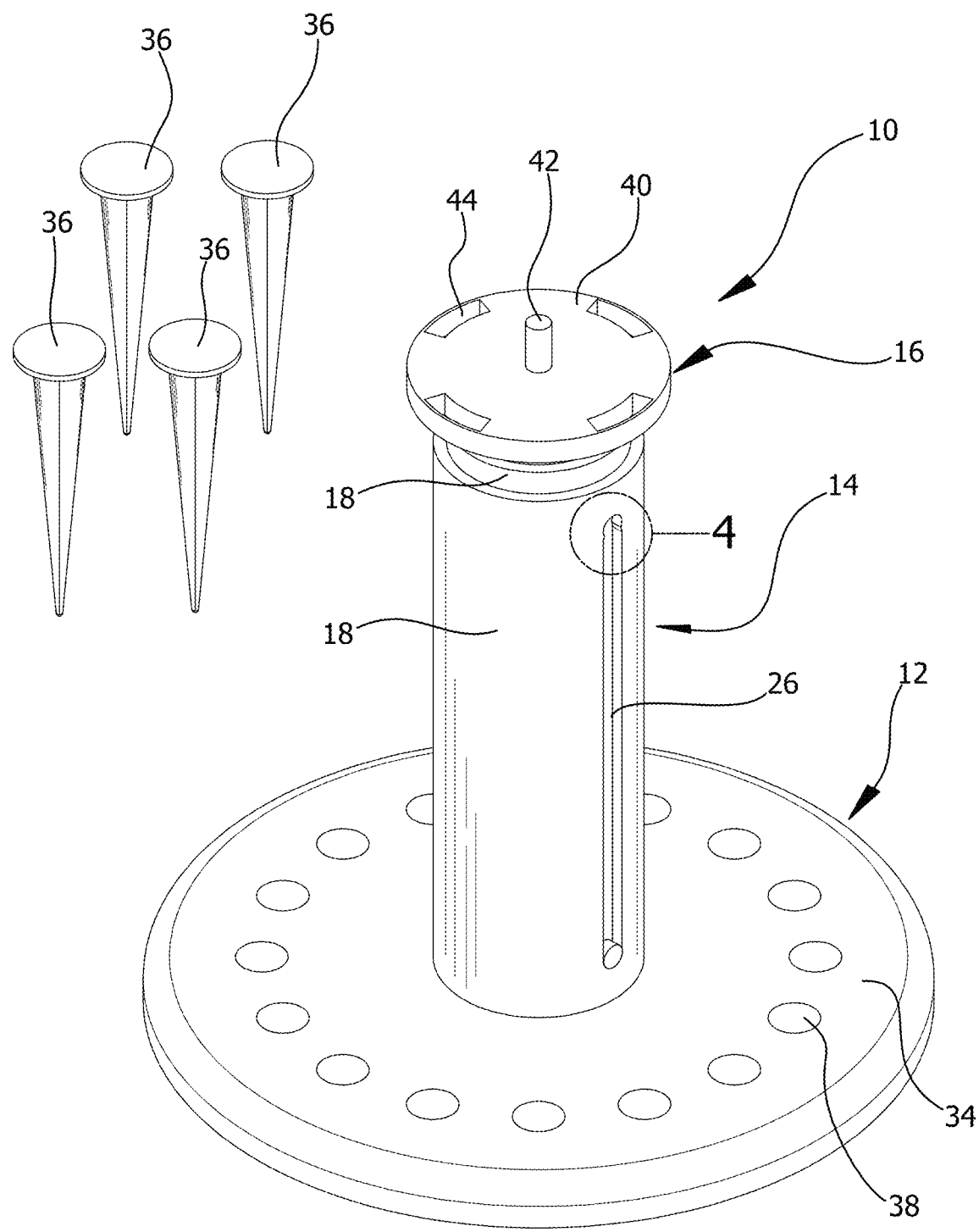
FIG. 1 is a top perspective view of a dog leash anchoring device according to an embodiment of the disclosure.

With reference now to the drawings, and in particular to FIGS. 1 through 6 thereof, a new dog leash anchoring device embodying the principles and concepts of an embodiment of the disclosure and generally designated by the reference numeral 10 will be described.

As best illustrated in FIGS. 1 through 6, the dog leash anchoring device 10 generally comprises a base assembly 12, a shaft 14, and a rotatable attachment structure 16. The base assembly 12 is securable to a floor or ground surface. The shaft 14 projects vertically from the base assembly 12 and is selectively adjustable to different heights. The rotatable attachment structure 16 is positioned on top of the shaft 14 and designed to permit a leash clip 70 to be detachably connected thereto.

Figure 2:
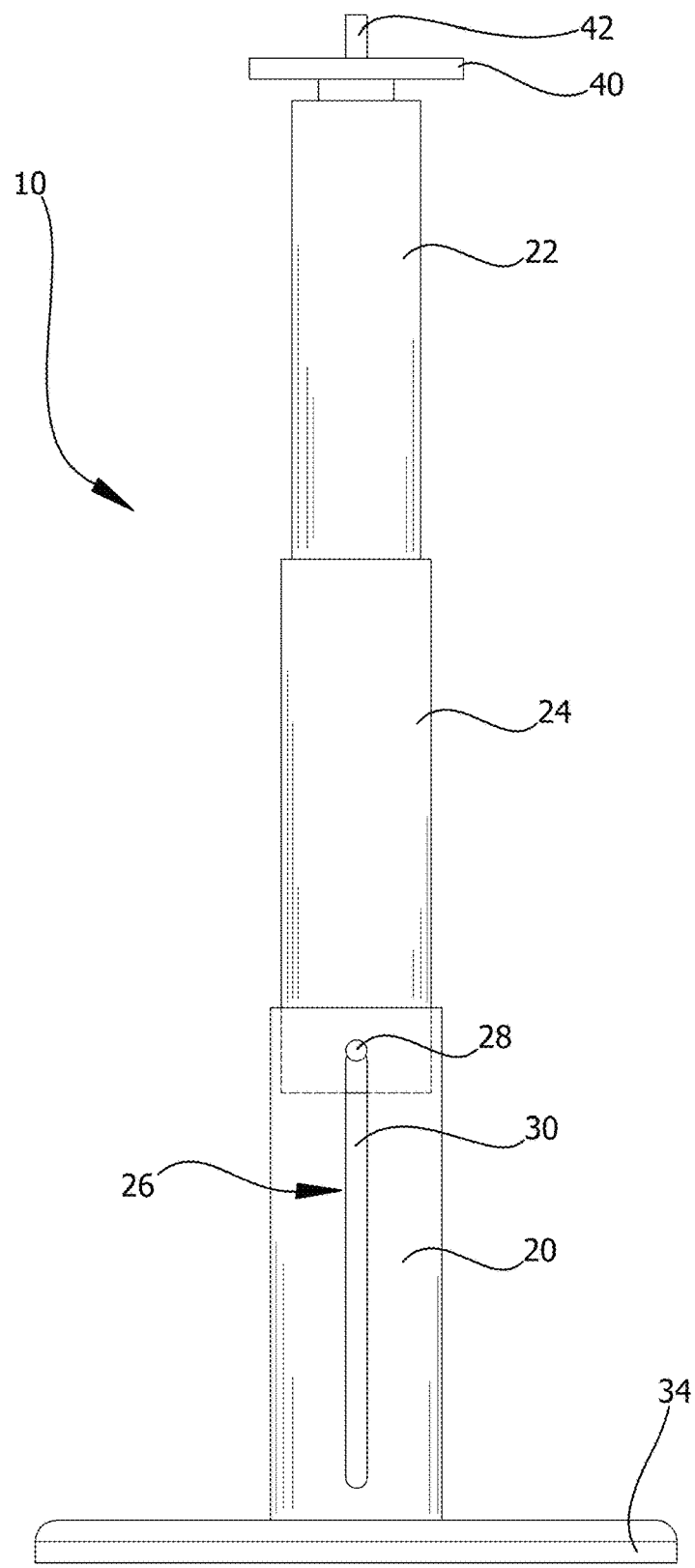
FIG. 2 is a front view of an embodiment of the disclosure.
Figure 3:
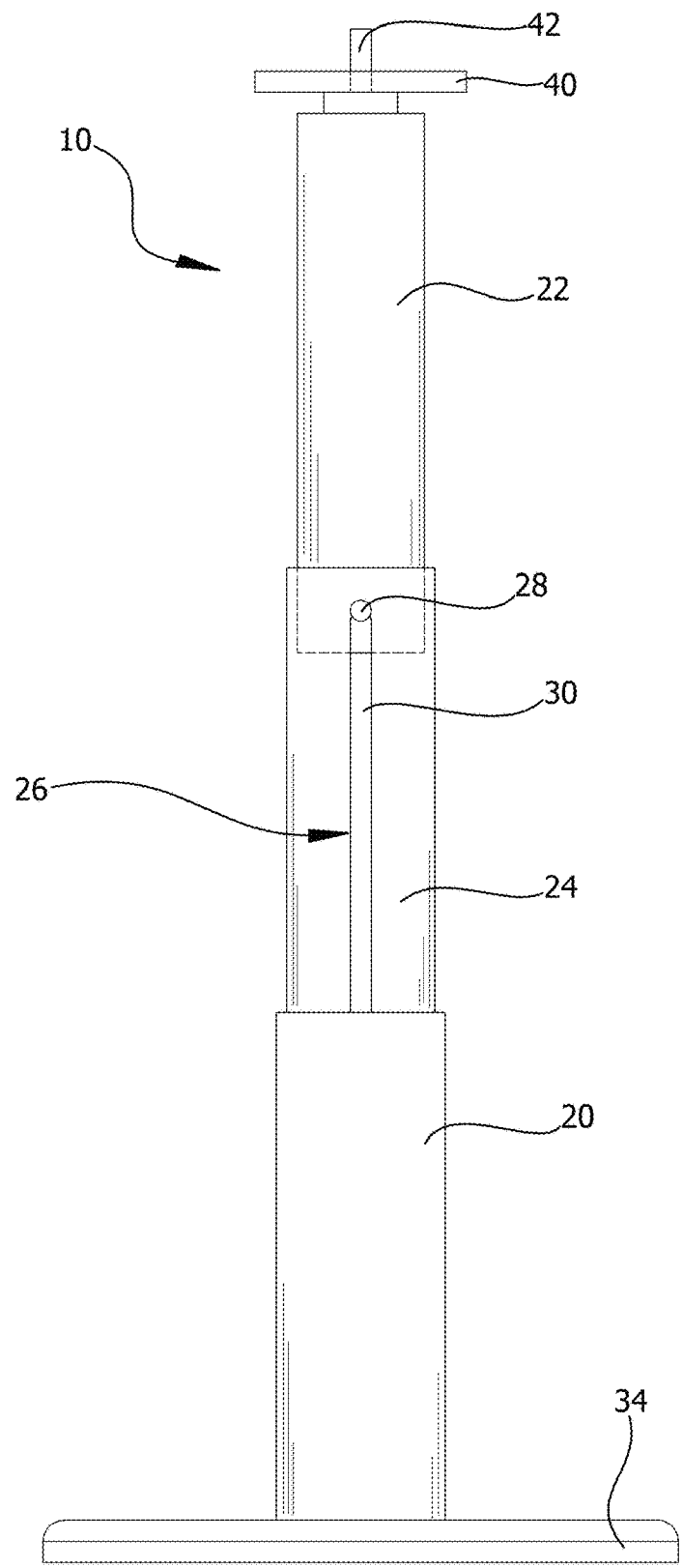
FIG. 3 is a rear view of an embodiment of the disclosure.
Figure 4:
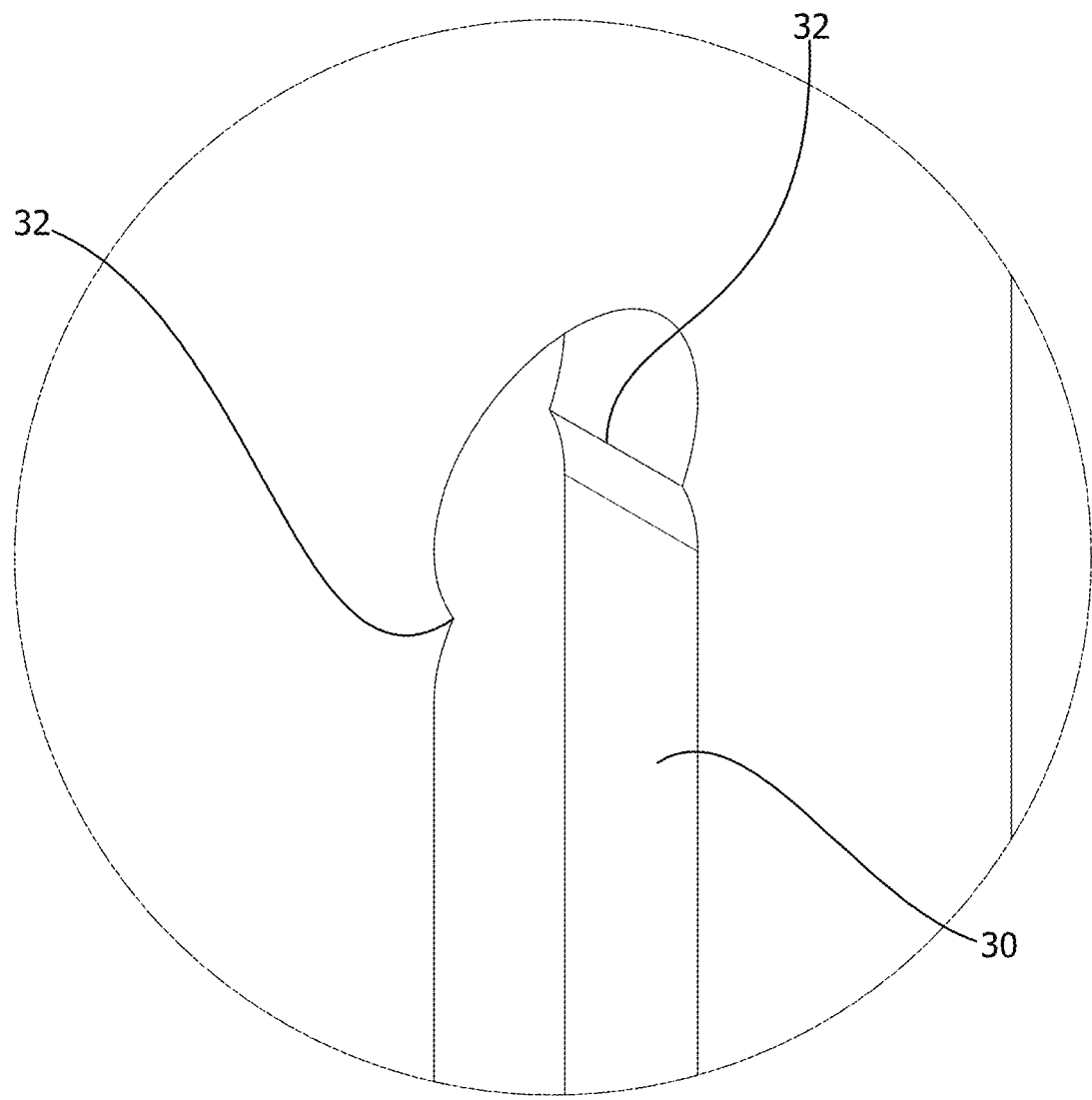
FIG. 4 is a close-up view of a portion of an embodiment of the disclosure.

The shaft 14 includes a plurality of telescoping segments 18 to permit adjustment of the height of the shaft 14. In the embodiment shown in the figures, there are three telescoping segments 18, though in other possible embodiments there could be more than three telescoping segments 18. As seen in FIGS. 2 and 3, the telescoping segments 18 comprise a base segment 20 attached to the base assembly 12, a top segment 22 on which the rotatable attachment structure 16 is rotatably mounted, and at least one middle segment 24. Each of the top segment 22 and the at least one middle segment 24 is movable between a retracted position, as shown in FIG. 1, and an extended position, as shown in FIGS. 2 and 3. The shaft 14 includes at least two locking assemblies 26 to releasably lock each of the top segment 22 and the at least one middle segment 24 in the extended position. In the exemplary embodiment shown in FIGS. 2 and 3, the locking assembly 26 includes a knob 28 and a slot 30, though other locking assemblies 26 could be used, such as a locking clamp or collar or a spring-loaded push pin. As seen in FIG. 3, for example, when the top segment 22 is moved into the extended position, the knob 28 is slid along the slot 30 until it reaches the end of the slot 30. As shown in FIG. 4, the end of the slot 30 has a pair of retaining indents 32 that create a retaining space to hold the knob 28 and thus the top segment 22 in the extended position.

Figure 5:
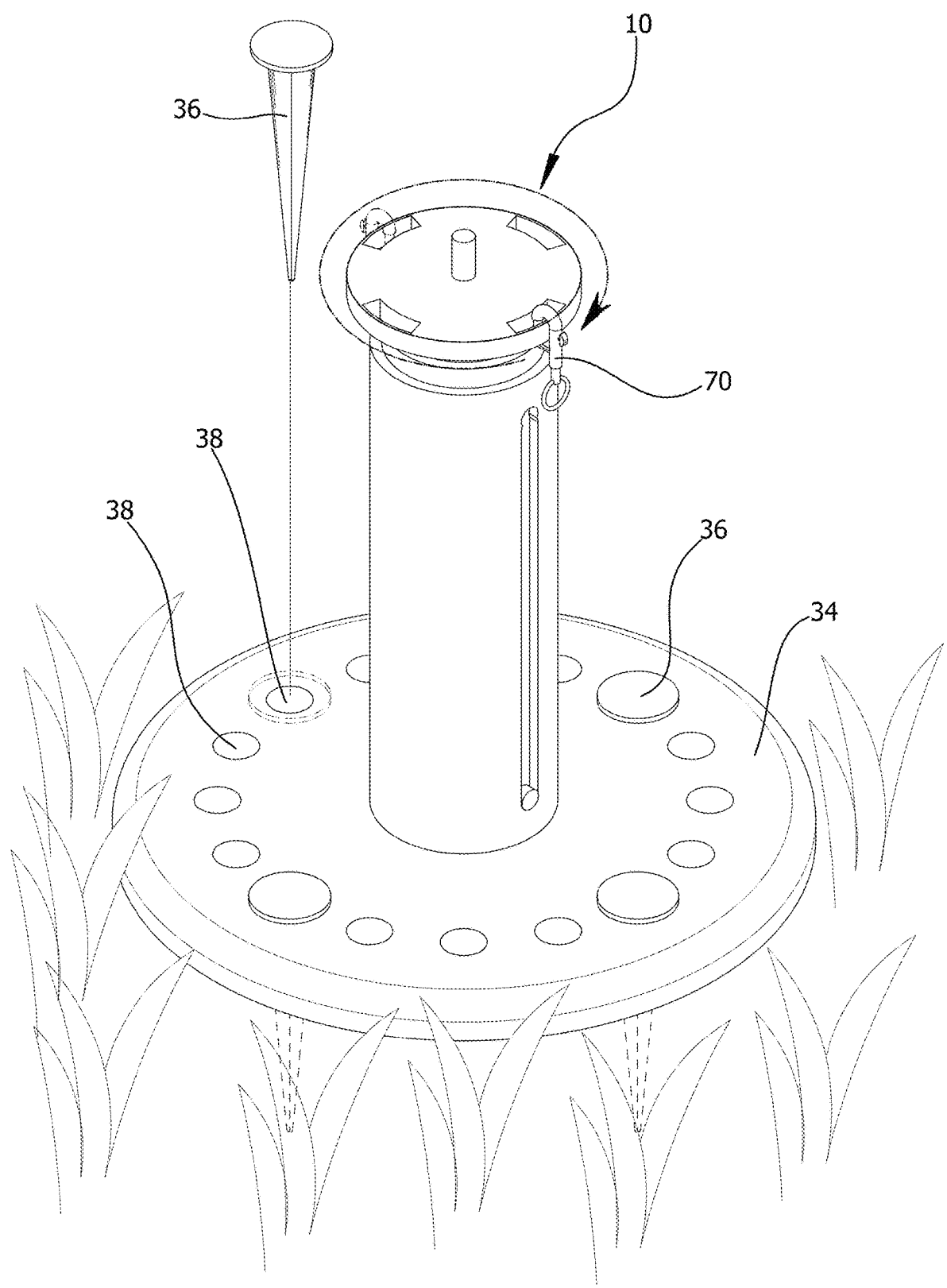
FIG. 5 is a perspective view of an embodiment of the disclosure in use.
Figure 6:
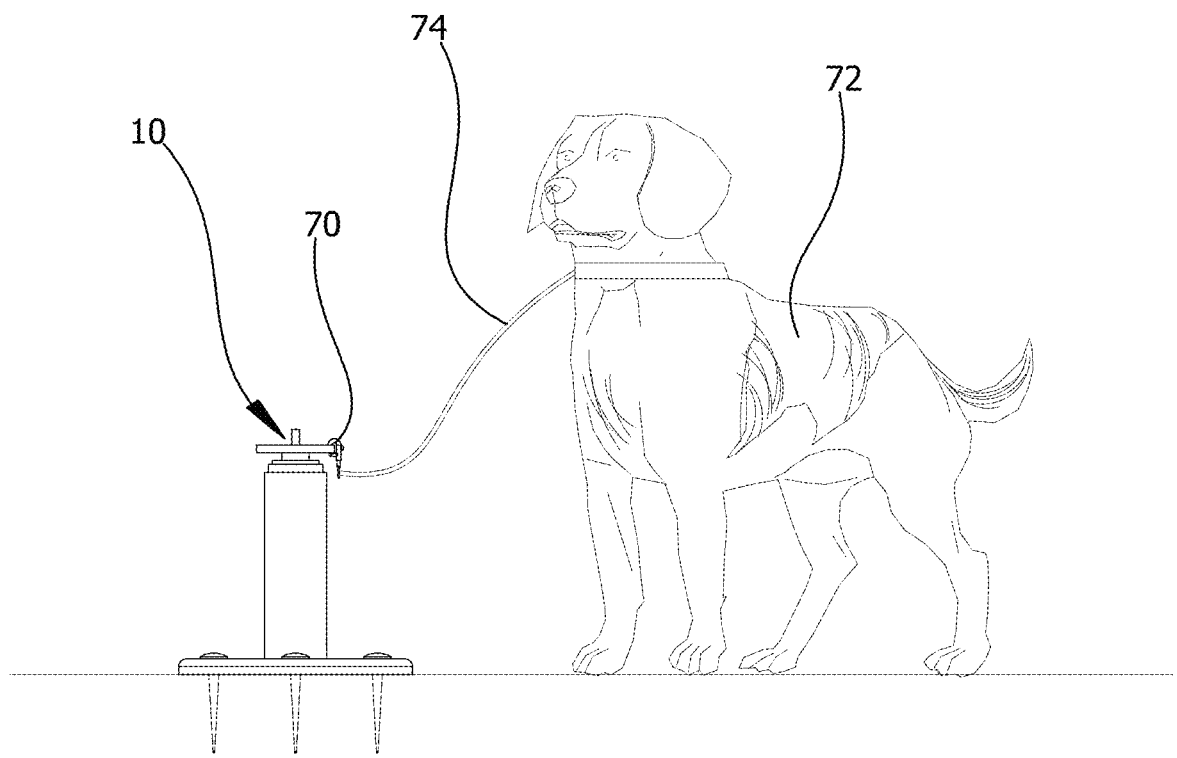
FIG. 6 is a side view of an embodiment of the disclosure in use.

The base assembly 12 includes a plate 34 and a plurality of securing structures 36 to secure the plate 34 to a floor or ground surface. As shown in FIGS. 1 and 5, the securing structures 36 can be stakes or pins and the plate 34 includes a plurality of openings 38 through which the stakes or pins are insertable. The stakes or pins can be inserted into the ground to anchor the plate 34 in place, as shown in FIGS. 5 and 6. In at least one possible embodiment, the plate 34 could include suction cups to permit temporary attachment to a hard surface or a floor.

The attachment structure 16 is rotatable about 360 degrees. In the embodiment shown in the figures, the attachment structure 16 includes a disc 40 rotatably mounted on a post 42 attached to the shaft 14. The attachment structure 16 includes a plurality of orifices 44 designed to receive a leash clip 70, as shown in FIG. 5.

To use the dog leash anchoring device 10, the pet owner inserts the securing structures 36, such as stakes or pins, through the plate 34 and into the ground. The pet owner then has the option to adjust the height of the shaft 14 by moving the telescoping segments 18 into the extended position. FIG. 6 shows the telescoping segments 18 in the retracted position. The height can be set close to the height of a dog 72 to help minimize tangling of a leash 74 with the dog 72 or winding of the leash 74 around the shaft 14. Since the attachment structure 16 is rotatable about 360 degrees, the dog 72 is free to run around the dog leash anchoring device 10 with minimal risk of winding the leash 74 around the shaft 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dog leash anchoring device comprising:
    a base assembly securable to a floor or ground surface;
    a shaft projecting vertically from said base assembly and being selectively adjustable to different heights;
    a rotatable attachment structure being disposed on top of said shaft and configured to permit a leash clip to be detachably connected thereto;
    said attachment structure is rotatable about 360 degrees; and
    said attachment structure comprises a disc rotatably mounted on a post attached to said shaft;
    wherein said shaft comprises a plurality of telescoping segments to permit adjustment of the height of said shaft;
    wherein said telescoping segments comprise a base segment attached to said base assembly, a top segment on which said rotatable attachment structure is rotatably mounted, and at least one middle segment, wherein each of said top segment and said at least one middle segment is movable between a retracted position and an extended position; and
    wherein said shaft comprises at least two locking assemblies to releasably lock each of said top segment and said at least one middle segment in said extended position, and each of the at least two locking assemblies includes a knob and a slot, the knob is configured to be slid along the slot, an end of the slot has a pair of retaining indents that create a retaining space to hold the knob.

2. The dog leash anchoring device of claim 1, wherein said base assembly comprises a plate and a plurality of securing structures to secure said plate to a floor or ground surface.

3. The dog leash anchoring device of claim 2, wherein said securing structures comprise stakes or pins and said plate comprises a plurality of openings through which said stakes or pins are insertable.

4. The dog leash anchoring device of claim 1, wherein said attachment structure comprises a plurality of orifices configured to receive a leash clip.

\* \* \* \* \*